(12) United States Patent
Yoshino et al.

(10) Patent No.: US 7,761,504 B2
(45) Date of Patent: Jul. 20, 2010

(54) MESSAGE COMMUNICATION DEVICE

(75) Inventors: Manabu Yoshino, Kyoto (JP); Taiyo Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 409 days.

(21) Appl. No.: 11/826,568

(22) Filed: Jul. 17, 2007

(65) Prior Publication Data

US 2008/0022318 A1 Jan. 24, 2008

(30) Foreign Application Priority Data

| Jul. 19, 2006 | (JP) | ............................. 2006-196562 |
| Jun. 8, 2007 | (JP) | ............................. 2007-152522 |

(51) Int. Cl.
*G06F 15/16* (2006.01)
*G06F 12/00* (2006.01)

(52) U.S. Cl. .................. 709/203; 707/E17.12; 711/138

(58) Field of Classification Search ........................ None
See application file for complete search history.

(56) References Cited

U.S. PATENT DOCUMENTS 6,912,522 B2  6/2005  Edgar

2006/0136677 A1 *  6/2006  Fuhs et al. ................... 711/147
2007/0055555 A1      3/2007  Baggett et al.
2007/0244964 A1 * 10/2007  Challenger et al. .......... 709/203

FOREIGN PATENT DOCUMENTS

JP          09-101901         4/1997

* cited by examiner

*Primary Examiner*—Wen-Tai Lin
(74) *Attorney, Agent, or Firm*—McDermott Will & Emery LLP

(57) ABSTRACT

An outgoing message judging device judges if an outgoing message transmitted by a sending process is cacheable or not; An outgoing message queue queues the outgoing message, when the judging result indicates to be noncacheable. A returning message judging device judges if a returning message transmitted by a receiving process is cacheable or not; A returning message queue queues the returning message, when the judging result indicates to be noncacheable. A message cache unit stores the returning message in association with the outgoing message corresponding to the outgoing message when the judgment result is cacheable, or caches the returning message corresponding to the outgoing message to transmit the returning message to the returning message queue when the judgment result is cacheable.

12 Claims, 15 Drawing Sheets

MESSAGE COMMUNICATION DEVICE

BACKGROUND OF THE INVENTION

1. Field of the Invention

The present invention relates to message communication devices for carrying out message communication among plurality of processes.

2. Description of the Related Art

A construction for carrying out message communications between processes on multi-process operating systems has been known in the prior art, as disclosed in JP H09-101901A for example. Also known have been various constitutions for client-servers which transmit/receive messages between plurality of clients and a server. In those constitutions, the number of message transmission/reception increases dramatically, as the number of client processes increases Especially, the process load on a server process increases severely, since the server process is required to return messages after completing required processing of the messages received from all the client processes.

The performance of the devices used in such constitution is often evaluated by shortening of turnaround times; i.e., the times required for returning results after requirements have been made by messages. Therefore, the increase in process load will affect the performance of the devices directly. In other words, since messages sent to a server process are processed one by one in chronological order of their receptions, processing of messages have to wait in the server process when the server is processing other messages even if client processes send messages. As a result, the responses from the server process are delayed in view of the client process so as to degrade the performance of the devices.

As example of application using communications between processes according to client server methods, for example, there is X window system. Further, also known has been technology for the Low Bandwidth X extension (LBX) as a functional extension of the X window system.

In the LBX, messages from client processes are received using a proxy process (LBX proxy), the plurality of messages is optimized, the optimized LBX messages are transmitted to a server process and picture drawing process is requested after converting the messages into LBX messages. The LBX proxy also has a local cache function and stores the results of message transmissions/receptions between client processes and a server process via LBX proxy in the local cache. And then, the LBX proxy returns the message directly to the client process based on the contents stored in the cache without passing through the server when the same processing is requested again from a client process and an it is judged to be unnecessary to send it to the server.

In the LBX, the number of times of the message transmission/reception between clients and a server can be reduced through executing the message transmission/reception between client process and server process via the LBX proxy. Consequently, the processing load on the server process is reduced, and the turnaround time leading up to return of the processing result, is improved in view of the client process. Incidentally, a proxy is a server or a program that relays accesses to web pages and the like, and is used to reduce traffics on networks in access to the identical web pages.

However, the amount of communication between proxy processes and a server process increases in method adding proxy processes (e.g., Low Bandwidth X extension) and the overall amount of the message transmission/reception increases. At the same time, the amount of signal processing in a whole device increases due to the increased amount of signal processing by the proxy process. Especially, in cases where all of the client process, proxy process and server process run on a same processor, the total amount of signal processing in the device even increases compared to the cases where the proxy process is not added. Increased amount of signal processing in a device leads to reduction in the CPU time allocated to the server process and client processes, which delays return of the processing results from the server process.

Because of the reasons described above, it is necessary to take a means for caching messages that are transmitted/received between client processes and a sever process without using a proxy process.

SUMMARY OF THE INVENTION

A message communication device according to the present invention carries out message communications between plurality of processes and comprises;

an outgoing message judging device judging whether the outgoing message transmitted from a outgoing process is cacheable or not, based on outgoing message judging conditions;

an outgoing message queue for queuing the outgoing message when the outgoing message judging device judges the outgoing message to be noncacheable so as to transmit the queued message sequentially to a receiving process;

a returning message judging device judging whether the returning message transmitted from the receiving process is cacheable or not, based on returning message judging conditions;

a returning message queue for queuing the returning message, when the returning message judging device judges the returning message to be noncacheable so as to transmit the queued message sequentially to the sending process; and a message cache unit for associating the returning message with the corresponding outgoing message in order to store the returning message when the returning message judging device judges the returning message to be cacheable, and for caching the returning message corresponding to the outgoing message so as to transmit it to the message queue when the returning message judging device judges the returning message to be cacheable.

In this constitution, outgoing messages transmitted through the sending process are judged to be cacheable or not, by the outgoing message judging device. When an outgoing message is judged to be noncacheable, the outgoing message is queued to the outgoing message queue. The "queuing" is a first-in first-out storage, wherein data and commands are stored one after another, and are output sequentially in the order of older data/command first. The receiving process sequentially retrieves the outgoing messages from the outgoing message queue. The receiving process executes the processing prescribed by the outgoing messages, prepares returning messages using the processing results and transmits the prepared returning messages to the sending process. The returning messages sent are judged by a returning message judging device if the returning messages are cacheable or not. When a returning message is judged to be cacheable, the returning message is cached in a message cache corresponding to the outgoing message.

When a returning message is judged to be noncacheable, the returning message is queued to a returning message queue and transmitted back to the sending process from the returning message queue. In case where an outgoing message is judged to be cacheable and the returning message corresponding to the outgoing message is stored in the message cache, the returning message is retrieved from the message cache, queued to the returning message queue and returned to the sending process. Accordingly, the sending process can retrieve the returning message directly from the returning message queue without waiting for the response from the receiving process. In other words, the sending process can continue its process with a short waiting time, even when the receiving process is treating other messages at a state under high load. In addition, no communication between the sending process and receiving process (inter-process communication) is generated and the amount of signal processing is reduced in the device as whole, by using the past returning messages stored in the message cache.

There is an embodiment that the message cache in the above constitution may comprise;

a message cache memory memorizing cashed messages, a cache searching device searching the messages cached in the message cache memory, an outgoing message updating device updating the cache contents of the message cache memory according to the contents of the outgoing message, a returning message updating device updating the cache contents of the message cache memory according to the contents of the returning message.

In this embodiment, the cache searching device, that received an outgoing message from the outgoing message judgment device, searches whether or not a returning message relevant to the message cache memory is cached. When a returning message has been already stored in the message cache memory in correspondence with the outgoing message in the embodiment, the cache searching device transmits the cached returning message to the returning message queue.

On the other hand, when no returning message corresponding to the outgoing message is found out in the message cache memory, the outgoing message updating device stores the identifier information of the outgoing message to the message cache memory. Then, the returning message updating device stores the returning message sent from the receiving process into the message cache memory in association with the outgoing message already stored.

There is another embodiment that the message communication device of the present invention may further comprise;

an outgoing message judging conditions list containing a set of outgoing message judging conditions selected according to arbitrary basis, a returning message judging conditions list containing a set of returning message judging conditions having the same contents as the outgoing message judging conditions list, a message judging condition changer for changing the outgoing message judging conditions list and returning message judging conditions list, wherein;

the outgoing message judging device judges the outgoing messages transmitted from the sending process, according to the outgoing message judging conditions list, and the returning message judging device judges the returning messages, transmitted from the receiving process, according to the returning message judging conditions list.

This embodiment is characterized in the respect that it has an outgoing message judging conditions list and a returning message judging conditions list, wherein the outgoing message judging device judges the outgoing message based on the contents of the outgoing message judging conditions list, whereas the returning message judging device judges the returning message based on the contents of the returning message judging conditions list. According to the embodiment, the caching efficiency is improved by selectively caching the outgoing messages and returning messages in the inter-process communication based on the arbitral conditions by arbitrarily setting the outgoing message judging conditions list and the returning message judging conditions list.

In the present invention, there is yet another embodiment further comprising;

an outgoing message judging condition changer dynamically changing the outgoing message judging conditions through a third process, and a returning message judging condition changer dynamically changing the returning message judging conditions through the third process, wherein, the outgoing message judging device changes the message judging conditions based on notifications from the outgoing message judging condition changer, and the returning message judging device changes the message judging conditions based on notifications from the returning message judging condition changer.

This embodiment is characterized in the respect that an outgoing message judging condition changer and returning message judging condition changer dynamically changes the message judging conditions of the outgoing message judging device and the returning message judging device respectively, through a third process. This aspect allows the message cache to dynamically change the message caching conditions depending on situations, for example, enables to switch between a process for caching messages and a process for not caching messages depending on the internal status of the receiving process. Consequently, the transmissions/receptions of messages are carried out more efficiently.

According to the present invention, a returning message can be obtained without waiting for a response from the receiving process and the sending process can continue its process with short waiting time, even when the receiving process is carrying out other message processing at a state of high load, if the returning message corresponding to an outgoing message is stored in the message cache. In addition, the amount of signal processing in the device is reduced as whole, because no communication between the sending process and receiving process is generated through using the past returning messages stored in the message cache.

The technology of the present invention is effective in reducing the load of receiving processes and in reducing response-waiting time of sending processes, and useful for message communication devices used between plurality of processes in multi-process operating systems.

BRIEF DESCRIPTION OF THE DRAWINGS

These and other purposes of the present invention will become apparent through the explanations of the following embodiments and be clearly defined by the appended claims. Various advantages that may not be described in this specification will become apparent to those skilled in the art by implementing the present invention.

DETAILED DESCRIPTION OF THE INVENTION

Hereinafter, the embodiments of the message communication devices according to the present invention are described in detail with reference to the drawings.

First Embodiments

Figure 1:
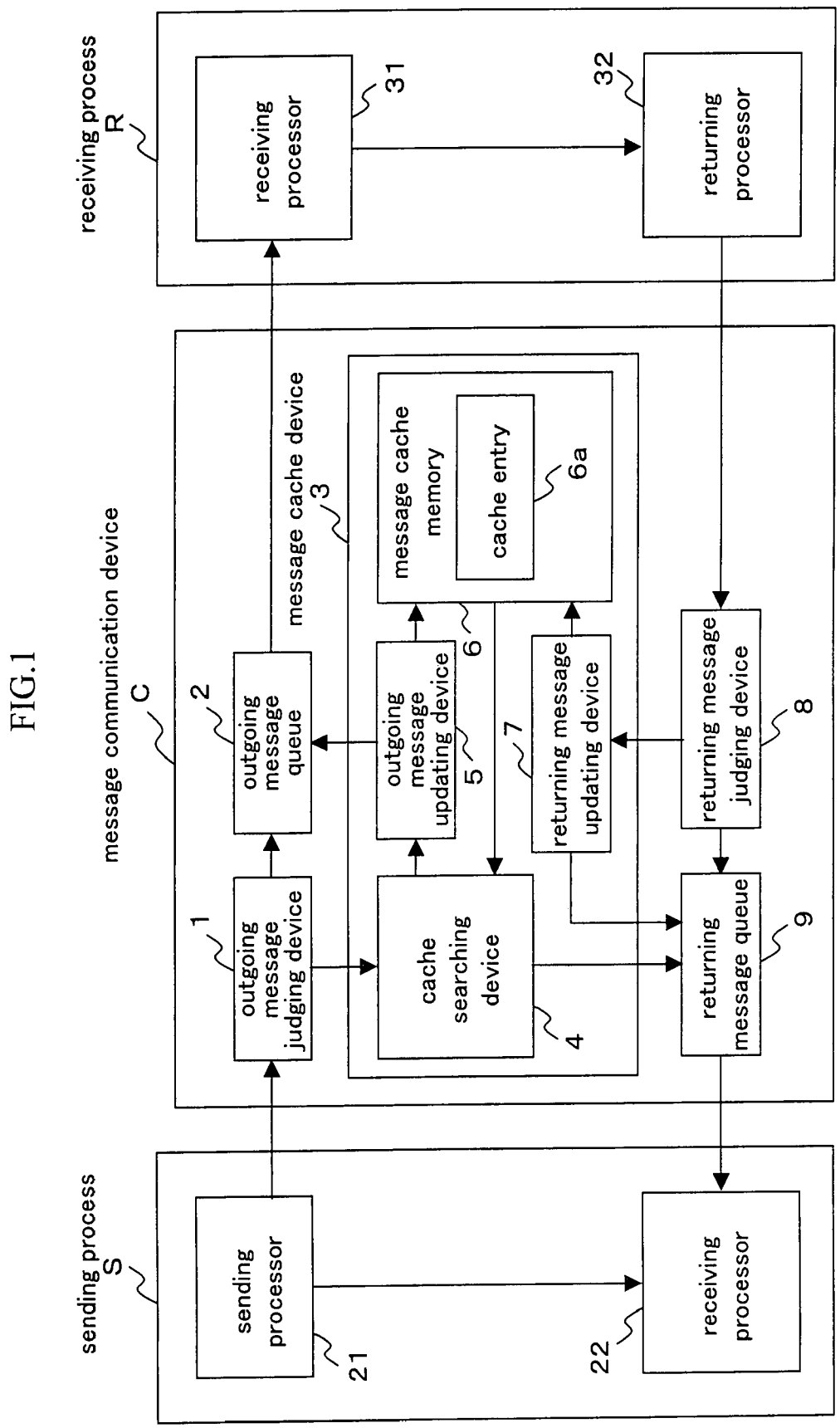
FIG. 1 is a block diagram showing the constitution of a message communication device of a first embodiment of the present invention.

FIG. 1 is a block diagram showing the constitution of a message communication device of a first embodiment of the present invention. The message communication device C of a first embodiment comprises an outgoing message judging device 1, an outgoing message queue 2, a message cache 3, returning message judging device 8 and returning message queue 9. The message cache 3 comprises a cache search device 4, outgoing message updating device 5, message cache memory 6 and returning message updating device 7. In addition, in the figure, S is a sending process, 21 is a sending processor, 22 is a receiving processor, R is a receiving process, 31 is a receiving processor and 32 is a returning processor.

The outgoing message judging device 1 judges if the message sent by the sending process S is cacheable or not. A cache is a means for shuffling a frequently used data into a high-speed processing device to speed up the process. When an outgoing message is judged to be noncacheable in the message judging device 1, the message is transferred to the outgoing message queue 2. The outgoing message queue 2 queues the outgoing message transmitted from the sending process S into a message queue constructed on a shared memory. The outgoing message queued in the outgoing message queue 2 is sequentially retrieved from the queue when the receiving process R has implemented reception.

If an outgoing message is judged to be cacheable by the message judging device 1, on the other hand, the outgoing message is transmitted to the message cache 3 so as to be cached therein. The returning message judging device 8 judges if a returning message transmitted by the receiving process R should be cached into the message cache 3. When it is judged to be cacheable, the returning message is transmitted to the message cache 3 so as to be cached therein. When it is judged to be noncacheable, the returning message is transmitted to the returning message queue 9.

The message cache memory 6 comprises a cache memory entry 6a, which include a message identification information field for storing information to identify outgoing messages and a returning message field for storing returning messages corresponding to the outgoing messages.

The cache searching device 4 judges if a returning message corresponding to an outgoing message is stored in the message cache memory 6, based on the message identification information field contained in the cache entry 6a in the message cache memory 6. When the returning message corresponding to the outgoing message is stored in the message cache memory 6, the cache search device 4 retrieves the corresponding returning message from the message cache memory 6 and transmits it to the returning message queue 9. When the returning message corresponding to the outgoing message is not stored in the message cache memory 6, the returning message judging device 8 transmits the outgoing message to the outgoing message updating device 5. The outgoing message updating device 5 stores the identification information of the outgoing message to the cache entry 6a and transmits the outgoing message to the outgoing message queue 2. The returning message updating device 7 stores the returning message to the cache entry 6a and transmits the returning message to the returning message queue 9.

Next, description is given of the procedure for performing the transmission/reception between the sending process S and receiving process R using the message communication device C.

(1) The operation of the sending process S is explained first. When the sending process S calls for the sending processor 21 and transmits an outgoing message, the outgoing message judging device 1 judges if the outgoing message is cacheable or not. If the message judging device 1 judges the outgoing message to be noncacheable, the outgoing message is transmitted to the outgoing message queue 2. Meanwhile, when the message judging device 1 judges the message to be cacheable, the outgoing message is transmitted to the cache search device 4. The cache search device 4 judges if the outgoing message corresponds to any of the contents in the cache entry 6a in the message cache memory 6.

If the outgoing message does not respond to any of the contents in the cache entry 6a, the outgoing message is transmitted to the outgoing message updating device 5. The outgoing message updating device 5, that has received the outgoing message, updates the contents in the cache entry 6a of the message cache memory 6 based on the content of the outgoing message, and then queues the outgoing message in the outgoing message queue 2. Herewith, the sending process is completed. Meanwhile, when the outgoing message responds to any of contents in the cache entry 6a, a returning message corresponding to the outgoing message is retrieved from the cache entry 6a and queued in the returning message queue 9. The sending process is thus completed.

Once the sending process is completed, the sending process S calls for the receiving processor 22 and retrieves the returning message from the returning message queue 9. At the time, when there is none of the returning messages queued in the returning message queue 9, the sending process S transfers the execution right of the CPU to other processes, because the sending process S goes into a waiting status for a period of until a returning message is queued in the returning message queue 9. The sending process in the waiting status recovers the CPU executing right at timing when a returning message is queued in the returning message queue 9. Herewith, the returning message can be retrieved from the returning message queue 9.

(2) Next, the operation of the receiving process R is explained. When the receiving process R calls for the receiving processor 31, an outgoing message is retrieved from the outgoing message queue 2. When there is no message queued in the outgoing message queue 2, the receiving process R turns into a waiting status and transfers the CPU execution right to other processes. The receiving process in the waiting status recovers the CPU execution right again at timing when an outgoing message has been queued in the outgoing message queue 2. Herewith, the outgoing message can be retrieved from the outgoing message queue 2.

The receiving process R, that retrieved the returning message through the receiving processor, carries out the process instructed by the outgoing message and prepares a returning message by use of the result. The receiving process R calls for the returning processor 32 and transmits the prepared message to the sending process S. The returning message judging device 8 judges if the returning message transmitted is cacheable or not. If the message judging device 8 judges the returning message to be noncacheable, the returning message is transmitted to the returning message queue 9. If the message judging device 8 judges the message to be cacheable, the returning message is transmitted to the returning message updating device 7. The message cache memory 6 updates the cache entry 6a based on the contents of the returning message. The sending process is completed by queuing the returning message with the returning message queue. After completion of the sending process of the returning message, the receiving process R calls for the receiving processor 31 again.

According to a first embodiment, the sending process S can receive a returning message without waiting for the response from the receiving process, in cases where the following conditions are satisfied;
  an outgoing message transmitted from the sending process S is judged to be cacheable by the outgoing message judging device 1;
  the returning message corresponding to the sending message is stored in the cache entry 6a of the message cache memory 6.

As a result, the sending process S can continue its process, even when the receiving process R is processing other messages at a state under high load. In addition, by utilizing the returning messages of the previously stored in the cache entry 6a, no communication between the sending process S and the receiving process R is generated, which is effective in reducing the overall amount of signal processing.

Second Embodiments

Figure 2:
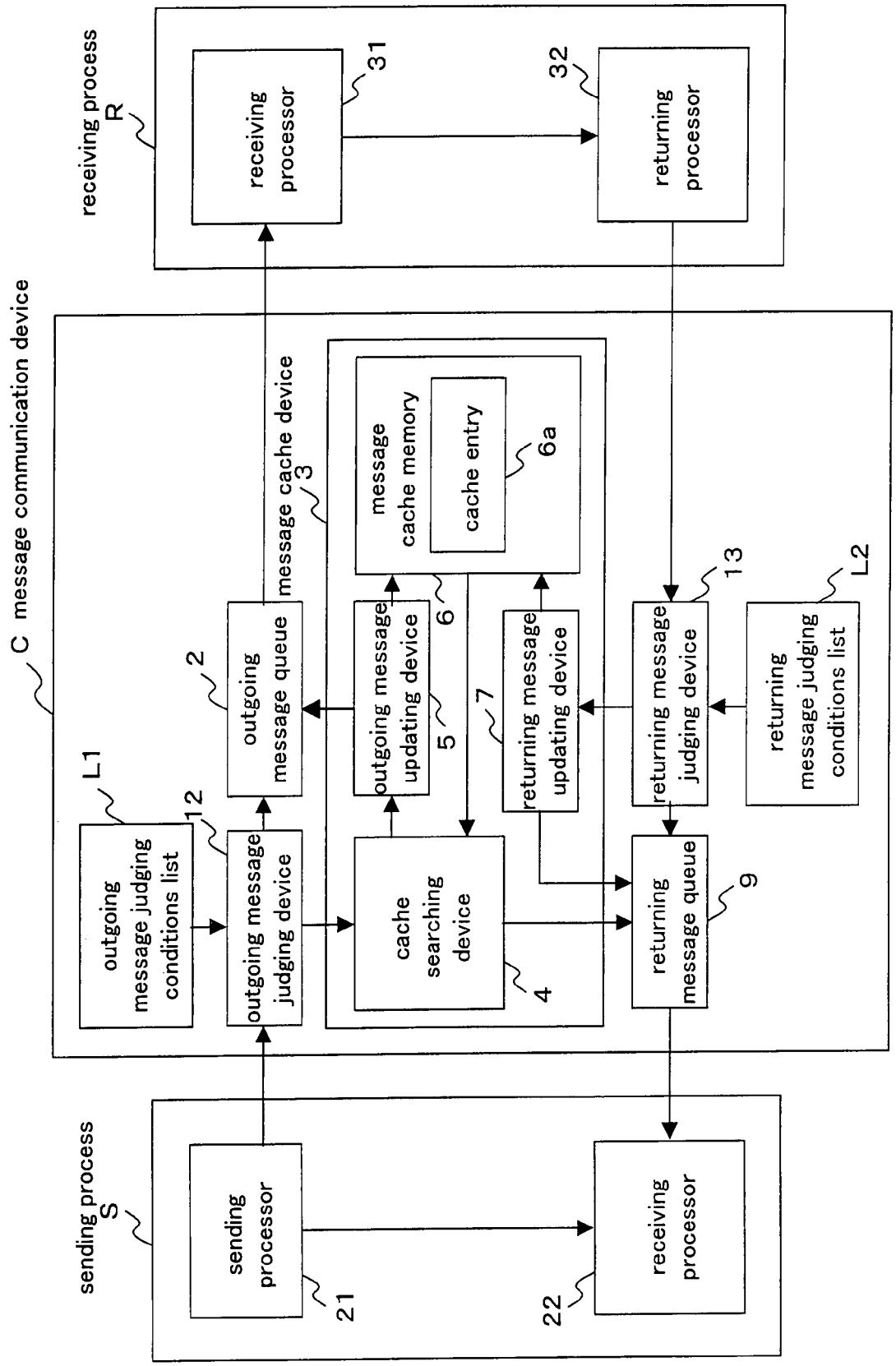
FIG. 2 is a block diagram showing the constitution of a message communication device of a second embodiment of the present invention.

FIG. 2 is a block diagram showing the constitution of a message communication device of a second embodiment of the present invention. In FIG. 2, the symbols similar as in the first embodiments (FIG. 1) denote the same components and their detailed explanations are omitted. The unique features of the second embodiments are as follows.

The outgoing message judging condition list L1 is a set of judging conditions for outgoing messages, and the outgoing message judging device 12 judges the outgoing messages based on the judging conditions in the message judging conditions list L1. The returning message judging condition list L2 is a set of judging conditions for returning messages, and the returning message judging device 13 judges returning messages based on the judging conditions in the message judging conditions list L2.

According to the embodiments, the outgoing message judging condition list L1 and returning message judging condition list L2 are set arbitrarily so as to cache the sending/returning messages at time of communication between processes selectively and thereby improve the caching efficiency.

Third Embodiments

Figure 3:
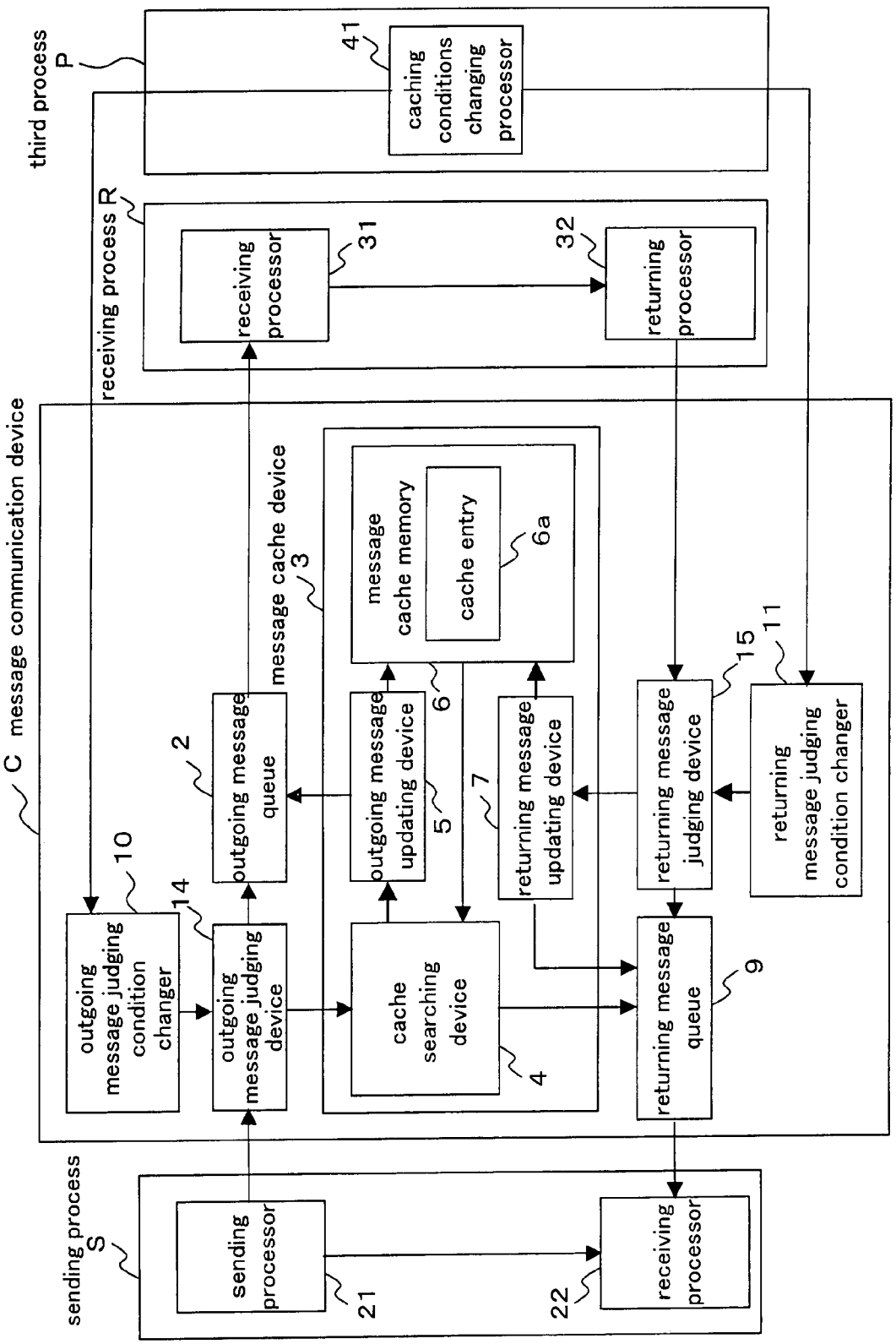
FIG. 3 is a block diagram showing the constitution of a message communication device of a third embodiment of the present invention.

FIG. 3 is a block diagram showing the constitution of a message communication device of a third embodiment of the present invention. In FIG. 3, the symbols similar as in the first embodiments (FIG. 1) denote the same components and their detailed explanations are neglected. The unique features of the third embodiments are as follows.

The message communication device of a third embodiment comprises an outgoing message judging condition changer 10, returning message judging condition changer 11 and a third process P. The outgoing message judging condition changer 10 dynamically changes the contents of the set of outgoing message identifiers included in the outgoing message conditions. The returning message judging condition changer 11 dynamically changes the contents of the set of returning message identifiers included in the returning message conditions. The third process P drives the outgoing message judging condition changer 10 and the returning message judging condition changer 11 and changes the contents of the sending/receiving conditions dynamically by calling for the caching condition changing processor 41.

According to the embodiments, the message communication device C can dynamically change the caching conditions depending on the variation of status. For example, messages are either cached or not cached depending on the status of the receiving process R.

Incidentally, the embodiments of the present invention are explained with respect to the cases where there is only one sending process S as the examples, however, the invention is not limited to such configurations. The nature of the present invention is that the invention comprises an configuration for reducing time during from transmission of an outgoing message up to reception of a returning message in the sending process S by caching retuning messages from the receiving process R. Therefore, the scope of the present invention includes not only the cases where there is only one sending process S, but also the cases where there is a plurality of sending processes S. In addition, although it is described that all of the structures are implemented with software, however, it should be noted that the same or similar effects can be obtained by achieving a equivalent function with hardware. Furthermore, the embodiments are explained for the cases where all of the processes are operated on one CUP, however, it should be noted that the same or similar effects can be obtained by operating each respective process on separate CPUs.

Forth Embodiments

Figure 4:
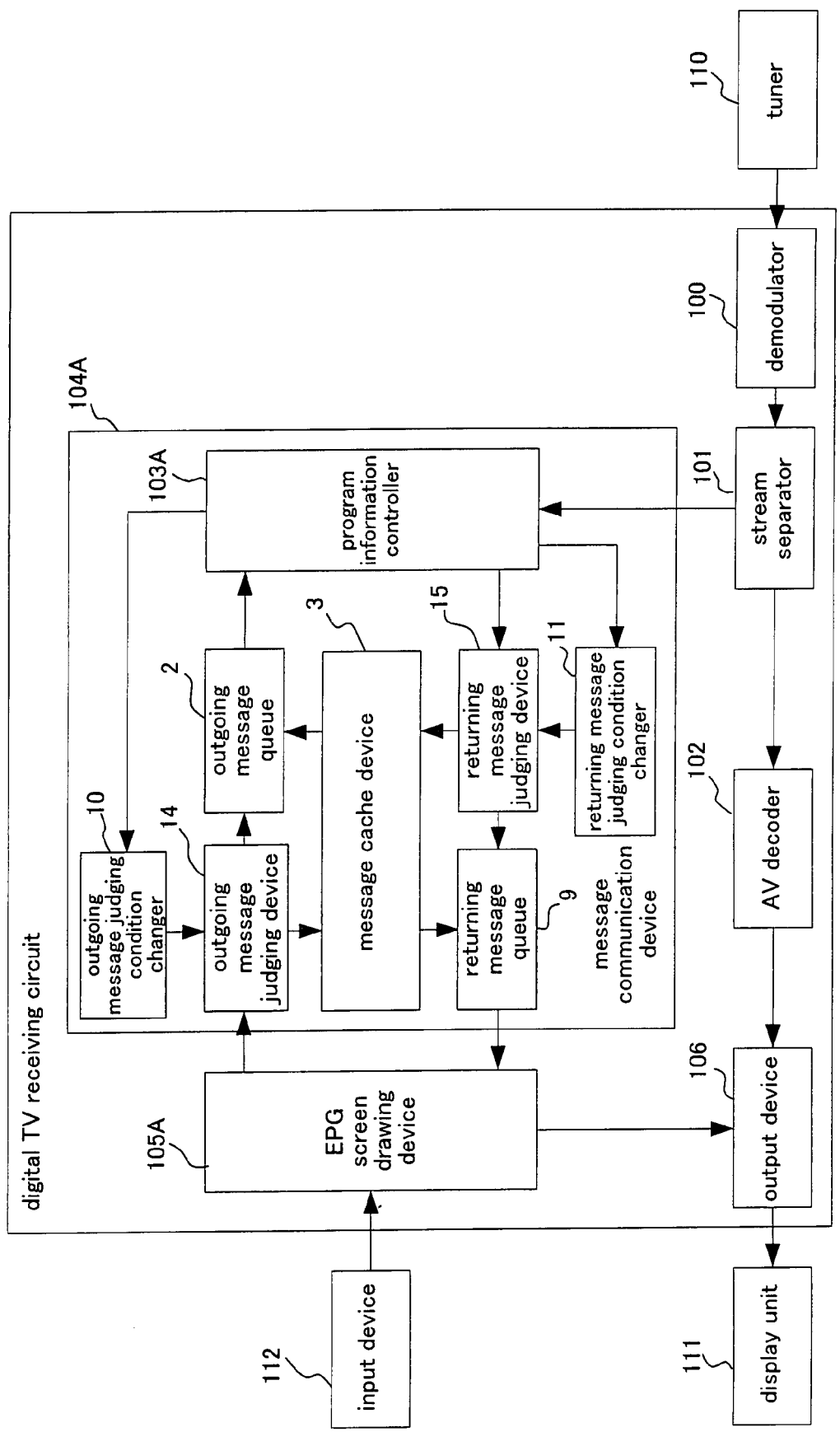
FIG. 4 is a block diagram showing the constitution of a digital TV receiving apparatus of a fourth embodiment of the present invention.

FIG. 4 is a block diagram showing the constitution of a digital TV receiving apparatus of a forth embodiment of the present invention. A digital TV receiving circuit according to the embodiments is connectable to a tuner 110, a display unit 111 and an input device 112. The digital TV receiving circuit comprises a demodulator 100, a stream separator 101, an AV decoder 102, a message communication device 104A, an EPG screen drawing device 105A and an output device 106. The message communication device 104A further comprises a program information controller 103A, in addition to the configulation of the message communication device of the third embodiments (see FIG. 3).

Next, the operations of the components according to the embodiments are explained. The tuner 110 receives digital TV broadcast waves, carries out tuning at an arbitrarily frequency and transmits the tuned digital TV broadcast waves to the demodulator 100. The demodulator 100 demodulates the digital TV broadcast waves input from the tuner 110 and outputs MPEG2 transport stream (hereinafter abbreviated as "TS"). The TS, output from the demodulator 100, is separated with the stream separator 101 into AV stream and program information. The AV stream separated from the TS is input into the AV decoder 102 and the program information is input into into the program information controller 103A. The program information controller 103A stores the program information received and returns the stored program information to the EPG screen drawing device 105A when the EPG screen drawing device 105A requests the program information via the message communication device 104A. The EPG screen drawing device 105A is launched by an event from the input device 112, then retrieves program information from the program information controller 103A, builds EPG screen images based on the program information and transmits it as the OSD screen image to the output device 106. The AV decoder 102 decodes the input AV stream to generate picture digital signal and sound digital signal, and transmits them to the output device 106. The output device 106 superimposes the OSD screen images formed by the EPG screen drawing device 105A onto the screen digital signal and sound digital signal generated by the AV decoder 102 and transmit them to the display unit 111. The display unit 111 forms video picture and sound from the picture digital signal and sound digital signal which are input so as to carry out a screen display and audio output.

Next, explanation is given of the procedures to execute communication for performing transmission/reception of message in order that the EPG screen drawing device 105A and the program information controller 103A inquire a program information using the message communication device 104A with a cache.

(1) Firstly, the operation of the EPG screen drawing device 105A is explained. When the EPG screen drawing device 105A is activated by an event of the input device 112 (e.g. a remote controller), the EPG screen drawing device 105A first determines the time slot frame for the program information to be displayed on the EPG screen. The starting time of the time slot frame is, for example, the current date and hour and the length of the time slot frame can be estimated from the number of programs displayable in the EPG screen at a time. The EPG screen drawing device 105A prepares an outgoing message to obtain the program information based on the time slot determined by an arbitrarily method.

Figure 12:
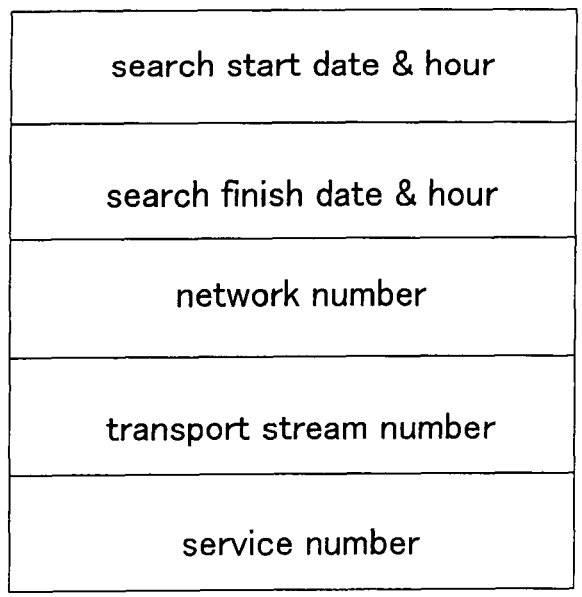
FIG. 12 is a block diagram showing the structure of an outgoing message in fourth to eleventh embodiments of the present invention.

FIG. 12 shows the structure of a message prepared at this time. The outgoing message includes at least the starting date & hour and finish date & hour of the time slot for obtaining the program information. Additionally, an outgoing message may contain other arbitrary information contained in the program information, such as a network number, transport stream number (which is required to identify the channel in retrieving program information of an arbitrary channel) and program category divisions (which are required to retrieve program information of an arbitrary category).

Figure 13:
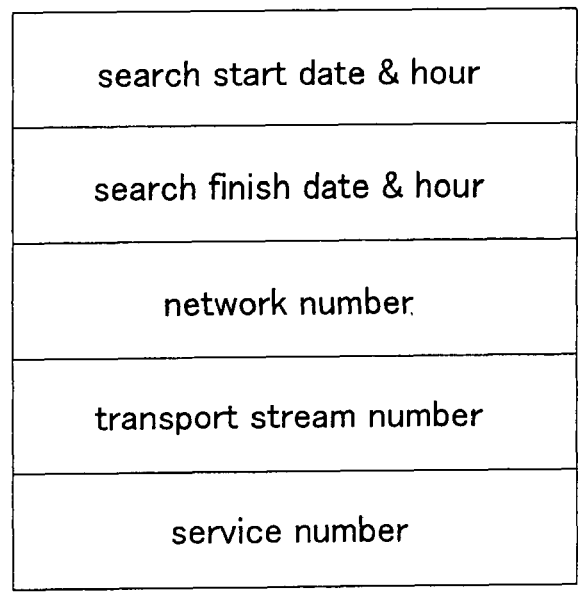
FIG. 13 is a block diagram showing the structure of an outgoing message judging conditions in fourth to eleventh embodiments of the present invention.

The EPG screen drawing device 105A supplies the formed outgoing message to the outgoing message judging device 1 of the message communication device 104A. The outgoing message judging device 1, that received the outgoing message, judges if the outgoing message is cacheable, by discriminating whether the outgoing message judging conditions stored in the message judging device 1 is contained into the time slot or not. FIG. 13 shows the structure of a message judging conditions included in the outgoing message judging device. The message judging conditions contain information concerning the starting date & time and finish date & time of the outgoing message to be cached. When the outgoing message contains other information, the message judging conditions may also contain the other information included in the program information like the outgoing message.

Incidentally, it may be done as below in cases where other program information is included in the outgoing message and outgoing message judging conditions. That is, when it is judged that there is an arbitrary relationship mutually between the contents of the program information and the program information included in the outgoing message conditions, the outgoing message may be regarded to be cacheable.

The outgoing message judged to be noncacheable is queued in the outgoing message queue 2. The outgoing message judged to be cacheable is transmitted to the message cache 3. The outgoing message transferred to the message cache 3 is transmitted to the cache search device 4 in the message cache 3 (see FIG. 3) and is judged herein if it responds to any contents of a cache entry 6a in the message cache memory 6 (see FIG. 3).

Figure 14:
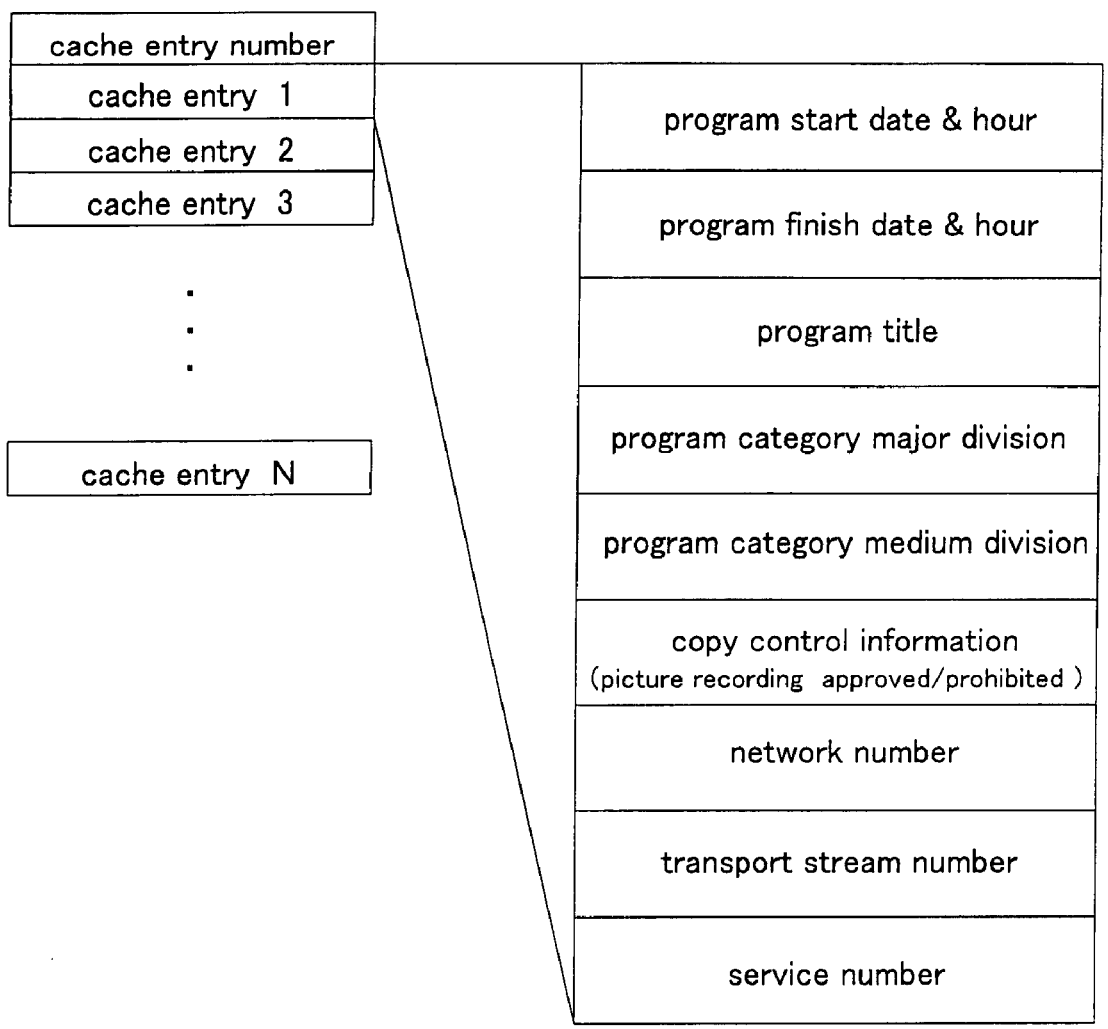
FIG. 14 is a block diagram showing the structure of a cache entries in fourth to eleventh embodiments of the present invention.

FIG. 14 shows the structure of program information contained in the cache entry 6a. The program information in the cache entry 6a includes a program starting date & hour, program finish date & hour, program title, program caption, network number, service number, transport stream number, program category major division, program category medium division and storable/non-storable flag (which indicates if a program is allowed to be stored in storage devices such as HDD).

The cache search device 4 determines, when all of the program information designated by the outgoing message is contained in the cache entry 6a stored in the message cache 3, the outgoing message responds to the contents of the cache entry 6a. When it is judged to not respond to it, the outgoing message is transferred to the outgoing message updating device 5 (see FIG. 3). The outgoing message updating device 5, that received the outgoing message, updates the contents of the cache entry 6a in the message cache memory 6 with the content of the outgoing message, then queues the outgoing message in the outgoing message queue 2 and thereafter, complete the sending process.

Meanwhile, in case the outgoing message is determined to respond to the contents of the cache entry 6a, the program information corresponding to the time slot designated by the outgoing message is retrieved from the cache entry 6a. A returning message is then prepared from the retrieved program information and the returning message thus prepared is queued in the returning message queue 9. Thereafter, the sending process is completed.

Figure 15:
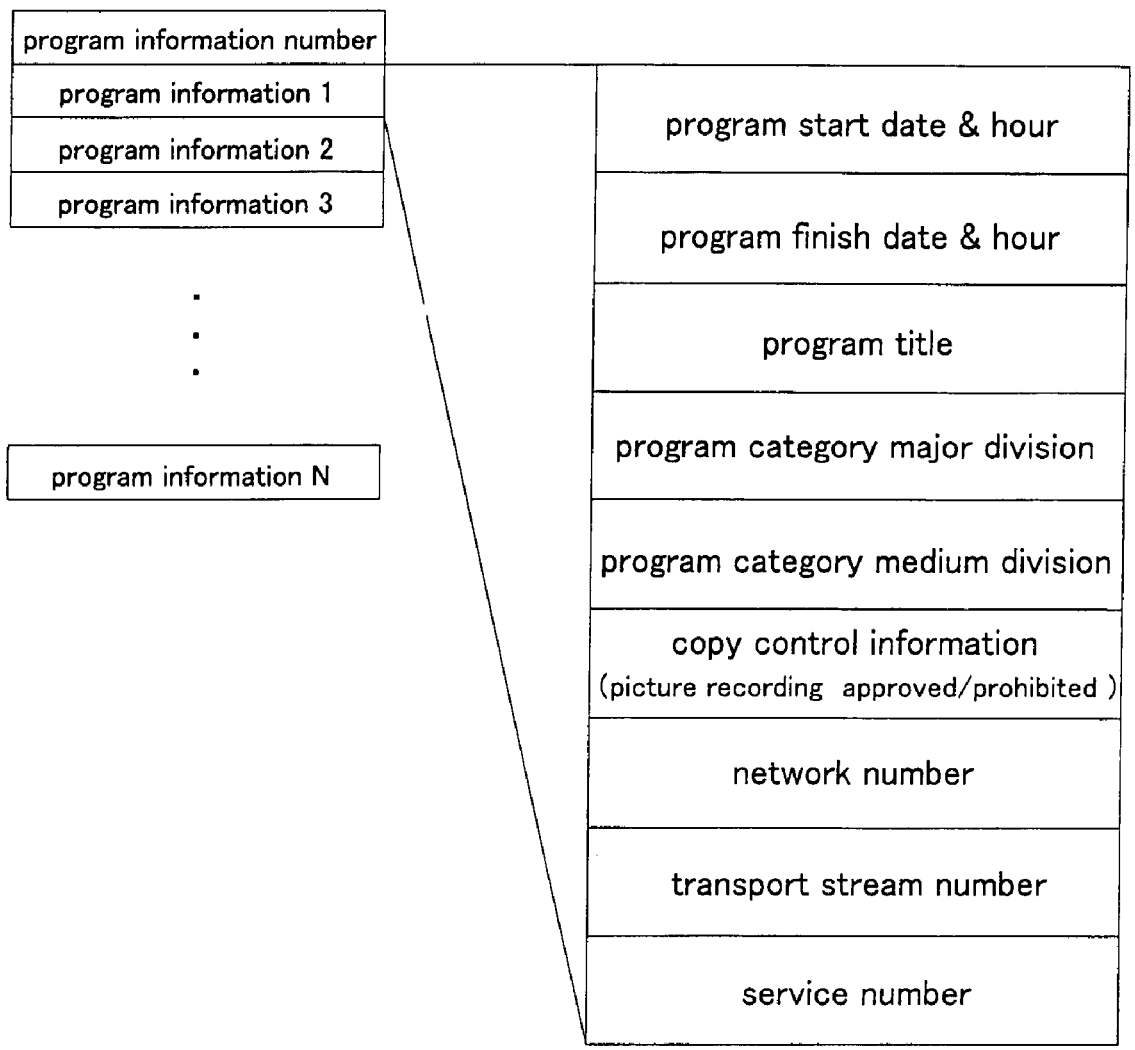
FIG. 15 is a block diagram showing the structure of a returning message in fourth to eleventh embodiments of the present invention.

FIG. 15 shows the structure of a returning message. The returning message contains number of program information pieces and a plurality of program information packets. A program packet includes a program start date & hour, program finish date & hour, program title, program caption, network number, service number, transport stream number, program category major division, program category medium division and storable/non-storable flag (which indicates if a program can be stored in storage devices such as HDD).

The message cache 3 searches all the pieces of program information corresponding to the time slot frame designated by the outgoing message from the program information contained in the cache entry 6a. The cache 3 then stores the individual piece of the searched information into the program information packet, and prepares a returning message by setting the number of the corresponding program information pieces as quantity of the program information packet.

When the sending process is completed, the EPG screen drawing device 105A retrieves the returning message from the returning message queue 9. The EPG screen drawing device 105A builds an EPG screen image based on the program information contained in the returning message and outputs the constructed EPG screen image to the output device 106 as an OSD display image.

(2) Next, the message returning operation of the program information controller 103A is explained. The program information controller 103A retrieves the returning message queued in the returning message queue 2. After retrieving the returning message, the program information controller 103A prepares a returning message by implementing the following processing;

searching all the pieces of program information corresponding to the time slot frame designated by the outgoing message from the information supplied from the stream separator 101 for storing and stores the individual piece of program information extracted through searching in a program information packet; and setting the number of pieces of program information extracted through the above searching as the program information packet number.

The program information controller 103A supplies the prepared returning message to the returning message judging device 15. The message returning judging device 15 transmits the supplied returning message to the returning message updating device 7 (see FIG. 3) and then judges if the time slot frame contained in the individual program information packet overlaps with the time slot frame designated by the returning message judging conditions stored in the returning message judging device 15. Judgment for the overlap of the time slot frame is carried out, for example, as below. That is, when the starting/or finishing date & time of time slot frame on one hand is contained within the range of time slot frame on the other hand, it is judged to be overlapped.

The returning message judging device 15 judges the returning message to be cacheable when there is an overlap between both of the time slot frames. When both of the time slot frames do not have any overlap with each other and the returning message is judged to be noncacheable, the returning message is queued in the returning message queue 9. Meanwhile, when there is an overlap between both of the time slot frames and the returning message is judged to be cacheable, the returning message is supplied to the returning message updating device 7. The returning message updating device 7, to which returning messages are sent, updates the contents of the cache entry 6a with the contents of the program information packet included in the returning message, further queues the returning message in the returning message queue 9 and thereafter completes the returning process.

(3) Next, the caching condition changing operation is explained. The program information controller 103A changes sending/returning message judging conditions included in the outgoing message judging device 14 and the returning message judging device 15, by operating the outgoing message judging condition changer 10 and returning message judging condition changer 11. Once the judging conditions have been changed, the outgoing message judging device 14 and returning message judging device 15 confirm the newly set judging conditions and discard the pieces of program information, which has not been corresponded to the message judging conditions any more, among the program information contained in the cache entry 6a.

Explanation is given of the case where only the program information within 12 hours period from the current time is stored in the cache entry 6a as an example. Assuming that the current hour is 0 o'clock, the message judging conditions indicating from 0 to 12 o'clock are stored as the message judging conditions of the outgoing message judging device 14 and returning message judging device 15. Similarly, the program information from 0 to 12 o'clock is stored in the cache entry 6a. When the current time becomes 1 o'clock, the program information controller 103A changes the message judging conditions of the outgoing message judging device 14 and returning message judging device 15 from 1 to 13 o'clock, by operating the outgoing message judging condition changer 10 and returning message judging condition changer 11.

In response to this change, the outgoing message judging device 14 and returning message judging device 15 discard the program information corresponding to from 0 to 1 o'clock from the record in the cache entry 6a. As a result, only the program information corresponding to from 1 to 12 o'clock remains in the cache entry 6a.

Incidentally, the operation for changing caching conditions is described as a structure executed by the program information controller 103A as an example, however, a similar effect can be obtained by taking a structure executed by the EPG screen drawing device 105A.

According to the embodiments, when the outgoing message transmitted by the EPG screen drawing device 105A is judged to be cacheable by the outgoing message judging device 14 and the program information corresponding to the outgoing message is stored in the cache entry 6a, the EPG screen drawing device 105A can obtain the program information without waiting for the response from the program information controller 103A. As a result, no message communication is generated between the program information controller 103A and EPG screen drawing device 105A, which reduces the overall amount of signal processing.

Furthermore, the program information controller 103A shortens the searching time in the cache entry 6a and improves cache efficiency by controlling the message cache 3 so as to cache only the program information having higher probability of reference, by use of controlling the outgoing message judging condition changer 10 and returning message judging condition changer 11.

Fifth Embodiments

Figure 5:
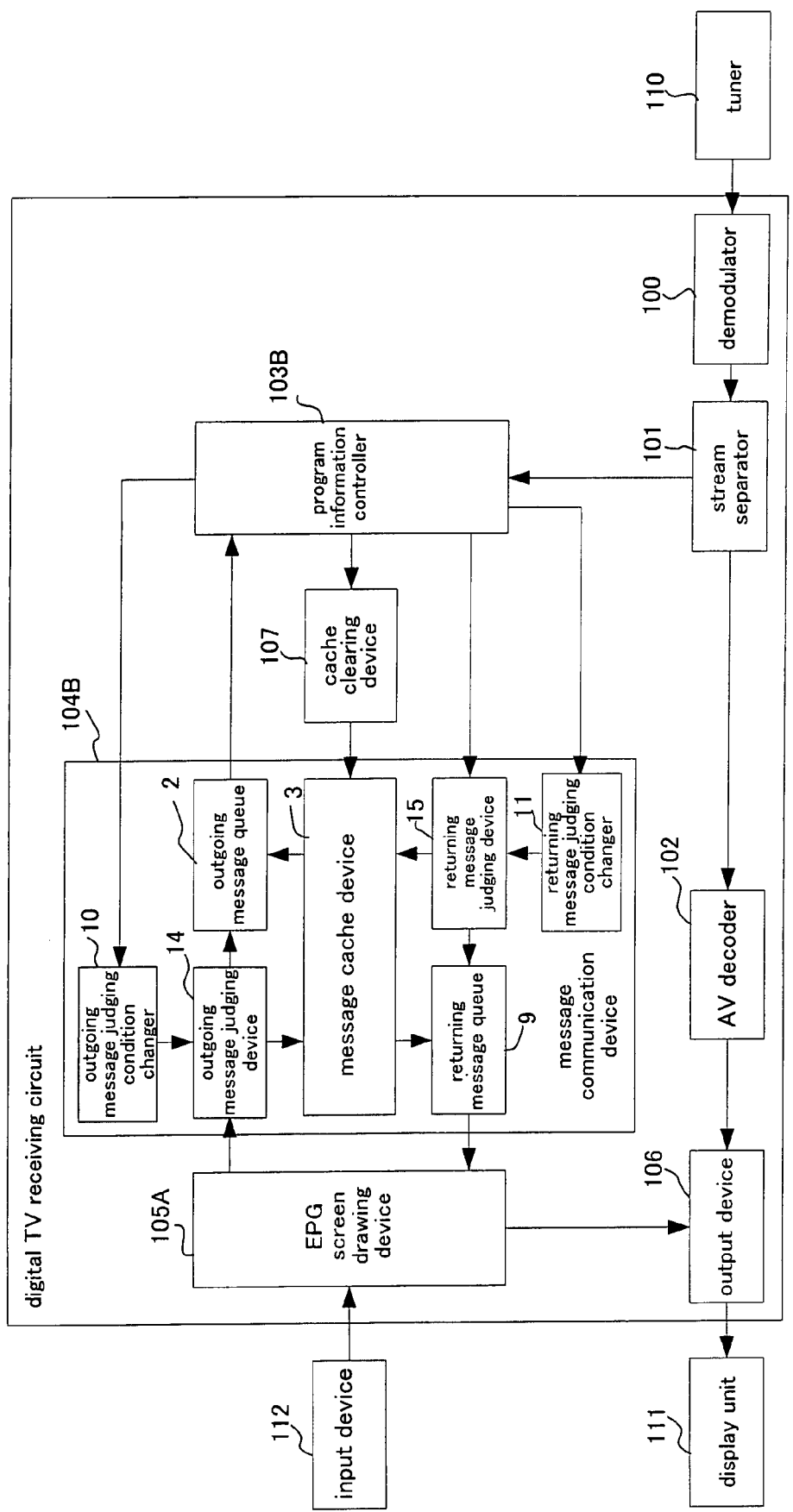
FIG. 5 is a block diagram showing the constitution of a digital TV receiving apparatus of a fifth embodiment of the present invention.

FIG. 5 is a block diagram showing the constitution of a digital TV receiving apparatus of a fifth embodiment of the present invention. The digital TV receiving circuit of the embodiments is connectable to a tuner 110, a display unit 111 and an input device 112. The digital TV receiving circuit comprises a demodulator 100, a stream separator 101, an AV decoder 102, a program information controller 103B, a message communication device 104B, a cache clearing device 107, an EPG screen drawing device 105A and an output device 106. The message communication device 104B comprises the structure of the message communication device of the third embodiments (see FIG. 3).

The operations of the components of the embodiments are explained as follows. All the components except for the program information controller 103B, since message communication device 104B and cache clearing device 107, are the same or similar operation as those in the forth embodiments, explanation is omitted here with respect to them and the description is given of only the parts where the operations differ from other embodiments. The program information controller 103B stores the program information received and, when the program information contains an emergency alert broadcasting identifier, clears the message cache in the program information controller 103B through operating the cache clearing device 107.

The procedure of message transmission/reception carried out by the message communication device 104B for the inquiry to the program information made by the EPG screen drawing device 105A and program information controller 103B is the same as in the case of forth embodiments, and hence the explanation is neglected.

In digital broadcasting, there is multi-channel broadcasting called emergency alert broadcasting, which is transmitted from broadcasting stations at the time of disaster generation. When emergency alert broadcasting comes on air, the programs on all the channels are replaced by the emergency alert broadcasting program. Therefore, the program information stored in the message cache 3 becomes wrong information in this regard.

According to the embodiments, all the cache contents in the message communication device 104B can be discarded, even when the program information is interrupted by the emergency alert broadcasting, in addition to the effect of the forth embodiments. Herewith, the EPG screen drawing device 105A is prevented from retrieving wrong program information from the message cache 3. As a result, the EPG screen drawing device 105A can always receive correct information from the program information controller, even when the programs are interrupted with the emergency alert broadcasting.

Sixth Embodiments

Figure 6:
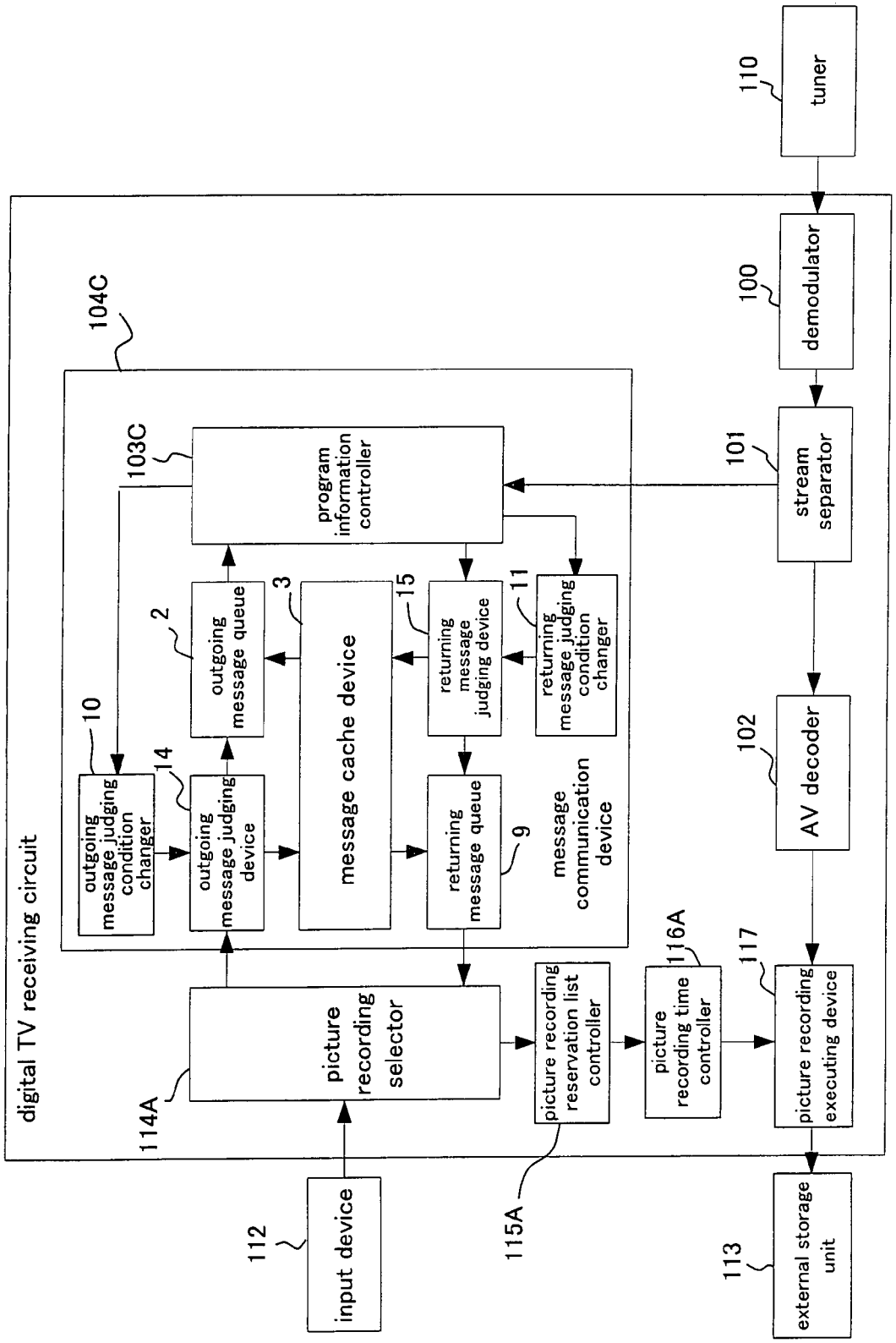
FIG. 6 is a block diagram showing the constitution of a digital TV receiving apparatus of a sixth embodiment of the present invention.

FIG. 6 is a block diagram showing the constitution of a digital TV receiving apparatus of a sixth embodiment of the present invention. The digital TV receiving circuit according to the embodiments is connectable to a tuner 110, external storage unit 113 and input device 112. The digital TV receiving circuit comprises a demodulator 100, stream separator 101, AV decoder 102, message communication device 104C, picture recording program selector 114A, picture recording reservation list controller 115A, picture recording time controller 116A and picture recording executing device 117. The message communication device 104C comprises a program information controller 103C, in addition to the structure of the message communication device of the third embodiments (FIG. 3).

Next, the operation of each component in the embodiments is explained. The demodulator 100 demodulates the digital TV broadcast waves input from the tuner 110 and produces TS. The stream separator 101 separates the formed TS into AV stream and program information. The AV stream is input into the AV decoder and the program information is input into the program information controller 103C. The picture recording program selector 114A transmits/receives messages with the program information controller 103C via the message communication device 104C, inquires program information so as to determine the program to be recorded and prepares picture recording reservation information.

Figure 16:
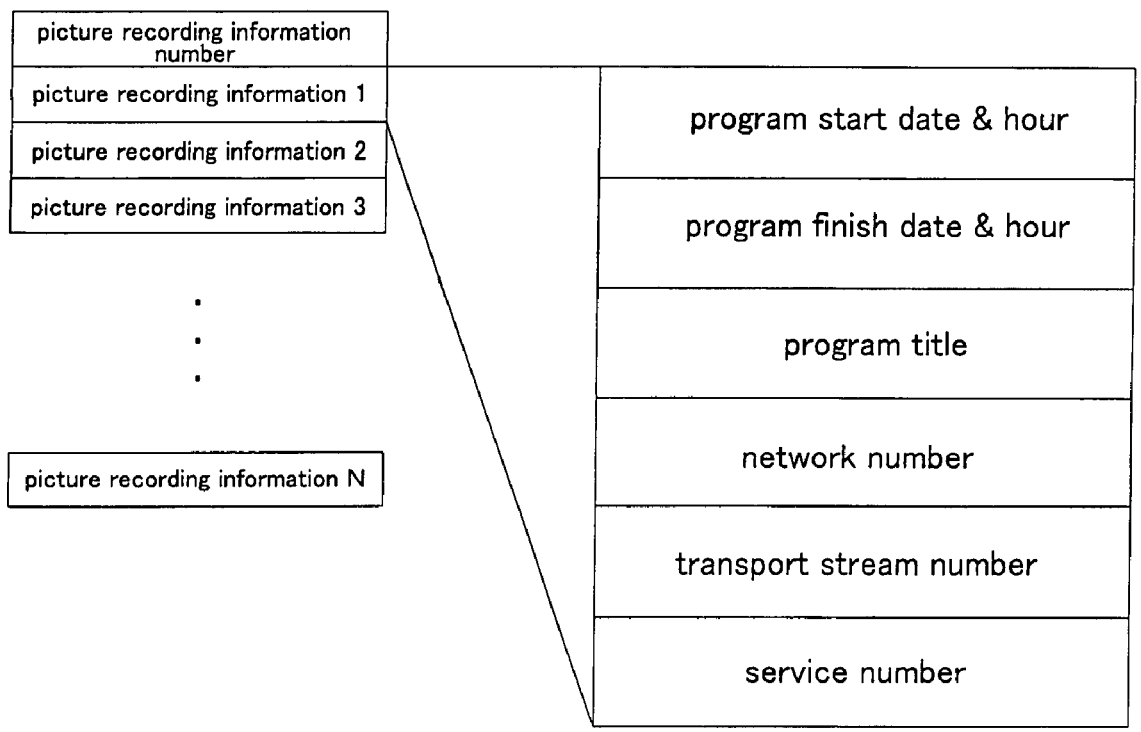
FIG. 16 is a block diagram showing the structure of a picture recording reservation list in sixth and ninth embodiments of the present invention.

FIG. 16 shows the structure of picture recording reservation information. The picture recording reservation information includes a picture recording start date & hour, picture recording finish date & hour, program name, network number and service number at least. The picture recording program selector 114A registers the prepared picture recording reservation information to the picture recording reservation list controller 115A. When the starting time of the program for recording, that is registered in the picture recording reservation list controller 115A, has come, the picture recording time controller 116A starts transmission/reception of messages with the program information controller 103C via the message communication device 104C, inquires program information, and confirms if the information of the program to be recorded has not been changed. When it is confirmed that the program information for recording is changed due to extension of other programs, the picture recording reservation information stored in the picture recording reservation list controller 115A is updated by resetting the changed starting hour of the program as the picture recording starting hour. Meanwhile, when it is confirmed that the program information for telerecording have not been changed, the picture recording time controller 116A operates the picture recording executing device 117 and records the program reserved. The picture recording executing device 117 encodes the picture & audio signals decoded by the AV decoder 102 with MPEG2 formats, and then stores the encoded signals into the external storage unit 113.

Besides, since the procedure of transmission/reception of information between the picture recording program selector 114A and program information controller 103C using the message communication device 104C is the same as the procedure of transmission/reception of messages between the EPG screen drawing device 105A and program information controller 103B, which has been described in the forth embodiments, the explanation is omitted here. Similarly, since the procedure of transmission/reception of information between the picture recording time controller 116A and program information controller 103C using the message communication device 104A is the same as the procedure of transmission/reception of messages between the EPG screen drawing device 105A and program information controller 103B, which has been described in the forth embodiments, the explanation is neglected.

According to the embodiments, the picture recording program selector 114A and picture recording time controller 116A do not have to wait for a response from the program information controller to obtain the program information, if the outgoing messages sent by the picture recording program selector 114A and picture recording time controller 116A are judged to be cacheable by the outgoing message judging device 14 and the program information corresponding to the outgoing messages is stored in the cache entry 6a of the message cache memory 6. As a result, there is no message communication between the picture recording program selector 114A and picture recording time controller 116A, and program information controller 103C, and thus the amount of signal processing in a whole circuit is reduced.

Furthermore, the program information controller 103C caches only the pieces of information, which are more likely to be referred, with the message cache 3, by using the outgoing message judging condition changer 10 and returning message judging condition changer 11. Herewith, the searching time is cut down and the cache effect can be enhanced.

Seventh Embodiments

Figure 7:
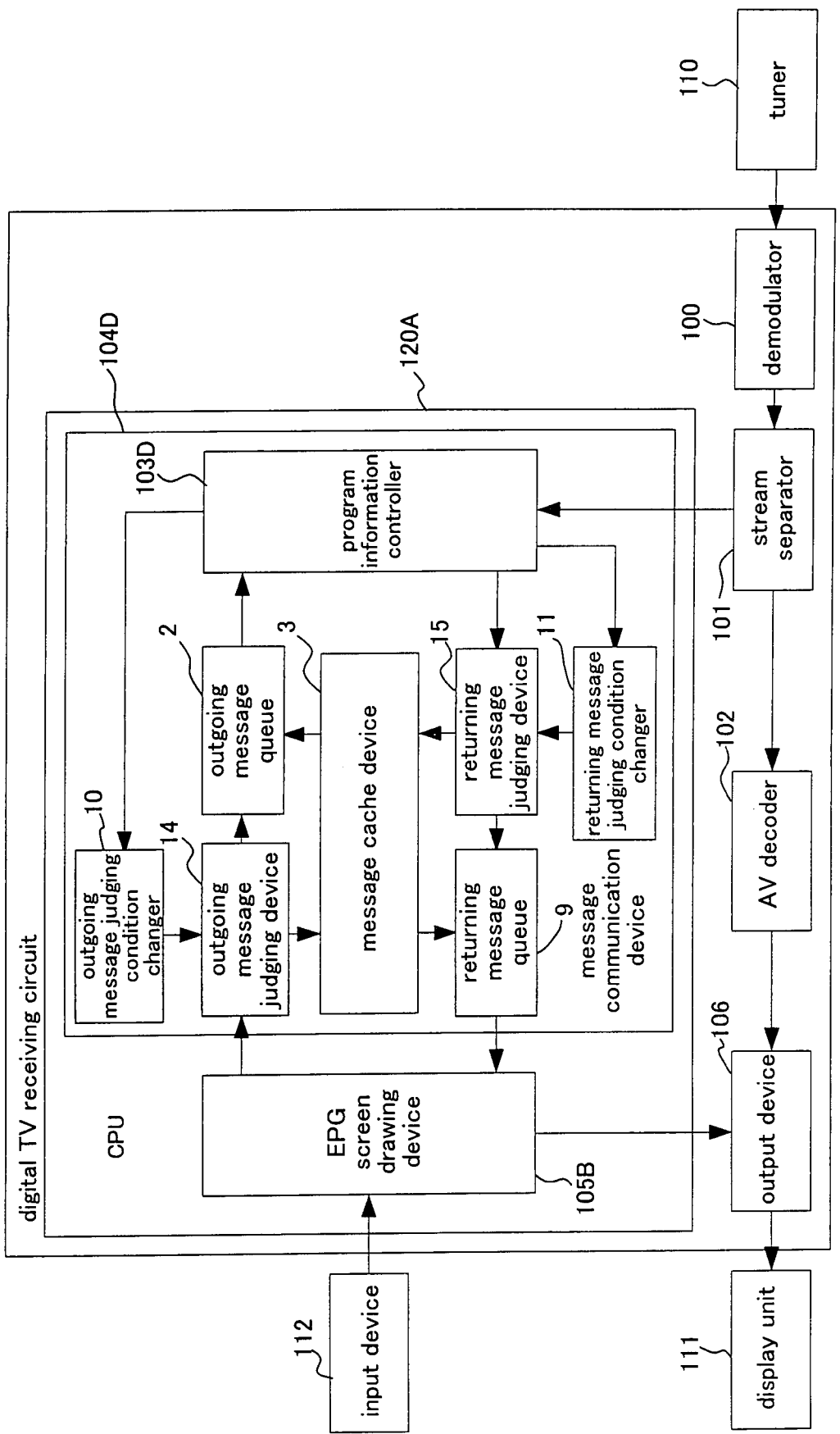
FIG. 7 is a block diagram showing the constitution of a digital TV receiving apparatus of a seventh embodiment of the present invention.

FIG. 7 is a block diagram showing the constitution of a digital TV receiving apparatus of a seventh embodiment of the present invention. The digital TV receiving circuit according to the embodiments is connectable to a tuner 110, display unit 111 and input device 112. The digital TV receiving circuit comprises a demodulator 100, stream separator 101, AV decoder 102, CPU 120A and output device 106. The CPU 120A is constituted so that at least the message communication device 104D and EPG screen drawing device 105B are operated. The message communication device 104D includes a message communication device C and a program information controller 103D. The program information controller 103D operates on a first process controlled by an arbitrarily scheduler (not shown) in the CPU 120A. The EPG screen drawing device 105B and the message communication device 104D (constructions other than the program information controller 103D) operates on a second process controlled by an arbitrarily scheduler (not shown) in the CPU 120A.

Then, the operation of each component in the embodiments is explained. All the components except for the message communication device 104D is operated similarly as explained in the forth embodiments, explanation thereof is omitted and only a part where operation is different is explained. The stream separator 101 stores the program information separated from the TS in a memory (not shown) shared with the CPU 120A and transmits the acquisition interruption of the program information to the CPU 120A. Once the acquisition interruption of the program information is detected, the program information controller 103D reads out the program information from a memory (not shown) shared with the stream separator 101 and controls the information. The EPG screen drawing device 105B draws a screen image of the EPG screen onto a memory (not shown) shared with the output device 106 and outputs the screen display signal to the output device 106. When the output device 106 receives a screen display signal, the output device 106 reads out the screen image from a memory (not shown) shared with the CPU 120 A, and then superimposes the screen image to the picture and audio signals received from the AV decoder 102 to output the obtained signal.

The procedure in which the EPG screen drawing device 105B and program information controller 103D transmit/receive messages by use of the message communication device 104D in order to inquire program information is the same as that in the case of the forth embodiments, and the explanation is omitted.

According to the embodiments, it is possible to reduce amount of communication between the EPG screen drawing device 105B and program information controller 103D by providing the message communication device 104D, which relieves the overall amount of signal processing in the CPU 120A.

In addition, even when the first process becomes tight due to processes other than that of the program information controller 103D, the EPG screen drawing device 105B is able to retrieve correct information from the cache in the message communication device 104D.

Eighth Embodiments

Figure 8:
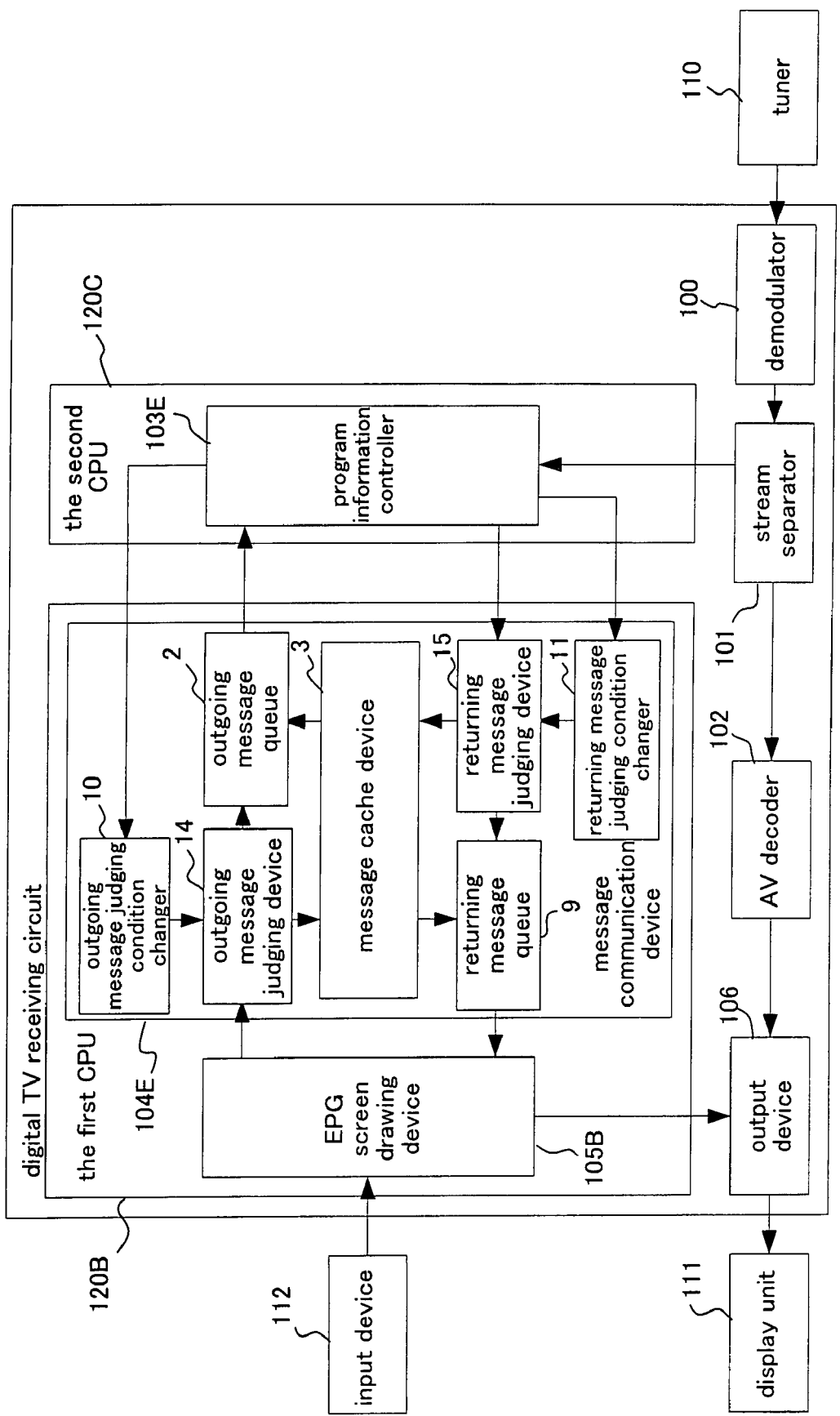
FIG. 8 is a block diagram showing the constitution of a digital TV receiving apparatus of an eighth embodiment of the present invention.

FIG. 8 is a block diagram showing the constitution of a digital TV receiving apparatus of an eighth embodiment of the present invention. The digital TV receiving circuit according to the embodiments is connectable to a tuner 110, display unit 111 and input device 112. The digital TV receiving circuit comprises a demodulator 100, stream separator 101, an AV decoder 102, output device 106, first CPU 120B and second CPU 120C. The second CPU 120C is communicable with the first CPU 120B. The first CPU 120B is constituted so that at least the message communication device 104E and EPG screen drawing device 105B are operated, meanwhile, the second CPU 120C is constituted so that the program information controller 103E is operated.

Then, the operation of each component in the embodiments is explained. Since operations of all the components except for the message communication device 104E are similar as explained in the forth embodiments, explanation thereof is neglected and only a part where operation is different is described. The stream separator 101 stores program information separated from the TS in a memory (not shown) referable by the first CPU 120B and transmits the acquisition interruption of the program information to the CPU 120B. Once the acquisition interruption of the program information is detected, the program information controller 103E reads out the program information from the memory (not shown) where the program information is written and controls the program information. The EPG screen drawing device 105B draws a screen image of the EPG screen onto a memory (not shown), which can be read by the output device 106, and transmits the screen display signal to the output device 106. When the output device 106 receives the screen display signal, the output device 106 reads out the screen image from the memory (not shown) written by the second CPU 120C, superimposes the screen image to the picture and audio signals received from the AV decoder 102 and outputs the obtained signal.

The first CPU 120B and second CPU 120C share a common memory (not shown) accessible by both the CPUs and are connected together via an interruption signal. The first CPU 120B queues outgoing messages to the outgoing message queue 2, issues interruption signals to the second CPU 120C and then transmits the message contents to the second CPU 120 via the common memory (not shown). The second CPU 120C drives the message communication device 104E operating on the first CPU 120B and carries out message transmission by writing returning message on the common memory (not shown) and then generating interruption signal.

The procedure in which the EPG screen drawing device 105B and the program information controller 103E transmit/receive messages in order to inquire program information through the message communication device 104E is the same as that in the case of the forth embodiments, and the explanation is abbreviated.

According to the embodiments, it is possible to reduce amount of communication between the EPG screen drawing device 105B and program information controller 103E by providing the message communication device 104E. It is particularly effective in relieving the overall amount of signal processing in the CPU 120C, which carries out the program information control.

In addition, even when the second CPU 120C gets stringent due to processes other than that of the program information controller 103E, the EPG screen drawing device 105B is able to retrieve correct information from the cache in the message communication device 104E.

Ninth Embodiments

Figure 9:
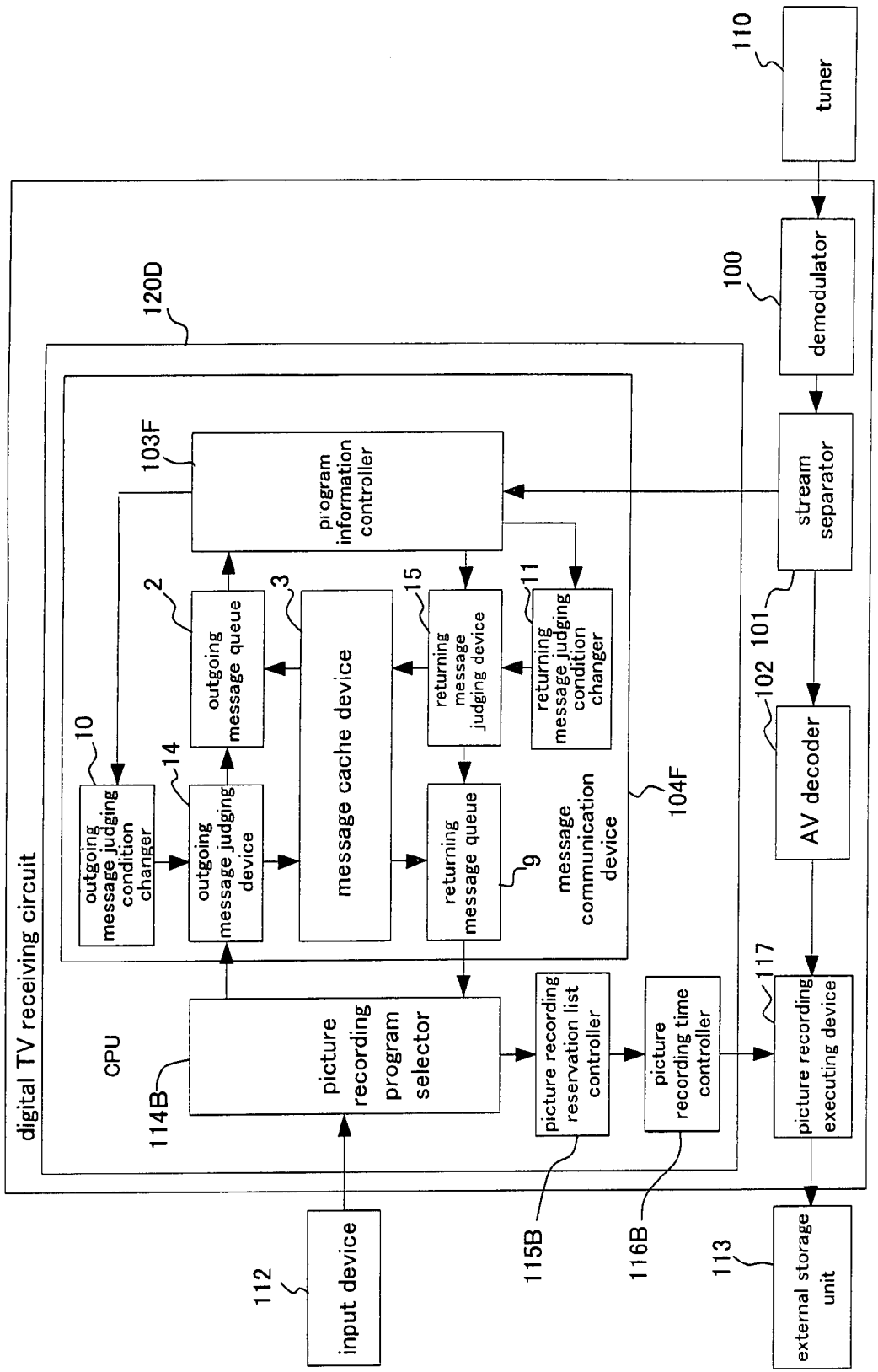
FIG. 9 is a block diagram showing the constitution of a digital TV receiving apparatus of a ninth embodiment of the present invention.

FIG. 9 is a block diagram showing the constitution of a digital TV receiving apparatus of a ninth embodiment of the present invention. The digital TV receiving apparatus according to the embodiments is connectable to a tuner 110, display unit 111 and input device 112. The digital TV receiving circuit comprises a demodulator 100, stream separator 101, AV decoder 102, CPU 120D and picture recording executing device 117. The CPU 120D is constituted so that at least a program information controller 103F, message communication device 104F, picture recording program selector 114B, picture recording reservation list controller 115B and picture recording time controller 116B are operated. The program information controller 103F operates on a first process controlled by an arbitrary scheduler (not shown) in the CPU 120D. The picture recording program selector 114B, picture recording reservation list controller 115B and picture recording time controller 116B operates on a second process controlled by a arbitrary scheduler (not shown) in the CPU 120D.

Then, the operation of each component in the embodiments is explained. Since operations of all the components except for the message communication device 104F are similar as explained in the sixth embodiments, explanation thereof is omitted and only a part where operation is different is described.

The stream separator 101 stores the program information separated from the TS in a memory (not shown) shared with the CPU 120D and then transmits the acquisition interruption of the program information to the CPU 120D. Once the acquisition interruption of the program information is detected, the program information controller 103F reads out the program information from a memory (not shown) shared with the stream separator 101 and controls the information. The picture recording time controller 116B detects time progress by interruptions of a timer (not shown) and controls the formation of the AV stream with the picture recording executing device 117, by issuing a picture recording starting signal and picture recording stopping signal to the picture recording executing device 117 through register accesses.

The procedure of transmission/reception of information executed between the picture recording program selector 114B and program information controller 103B using the message communication device 104F is the same as the procedure of transmission/reception of messages between the EPG screen drawing device 105A and program information controller 103A, which has been described in the forth embodiments, and the explanation is abbreviated. Similarly, the procedure of transmission/reception of information executed between the picture recording time controller 116B and program information controller 103F using the message communication device 104F is the same as the procedure of transmission/reception of messages between the EPG screen drawing device 105A and program information controller 103A, which has been described in the forth embodiments, and the explanation is abbreviated.

According to the embodiments, it is possible to reduce amount of communication between the picture recording program selector 114B and program information controller 103F, and amount of communication between the picture recording time controller 116B and program information controller 103F by providing the message communication device 104F, which relieves the overall amount of signal processing in the CPU 120D.

In addition, even when the first process gets stringent due to processes other than that of the program information controller 103F, the picture recording program selector 114B and the picture recording time controller 116B are able to retrieve correct information from the cache in the message communication device 104F.

Tenth Embodiments

Figure 10:
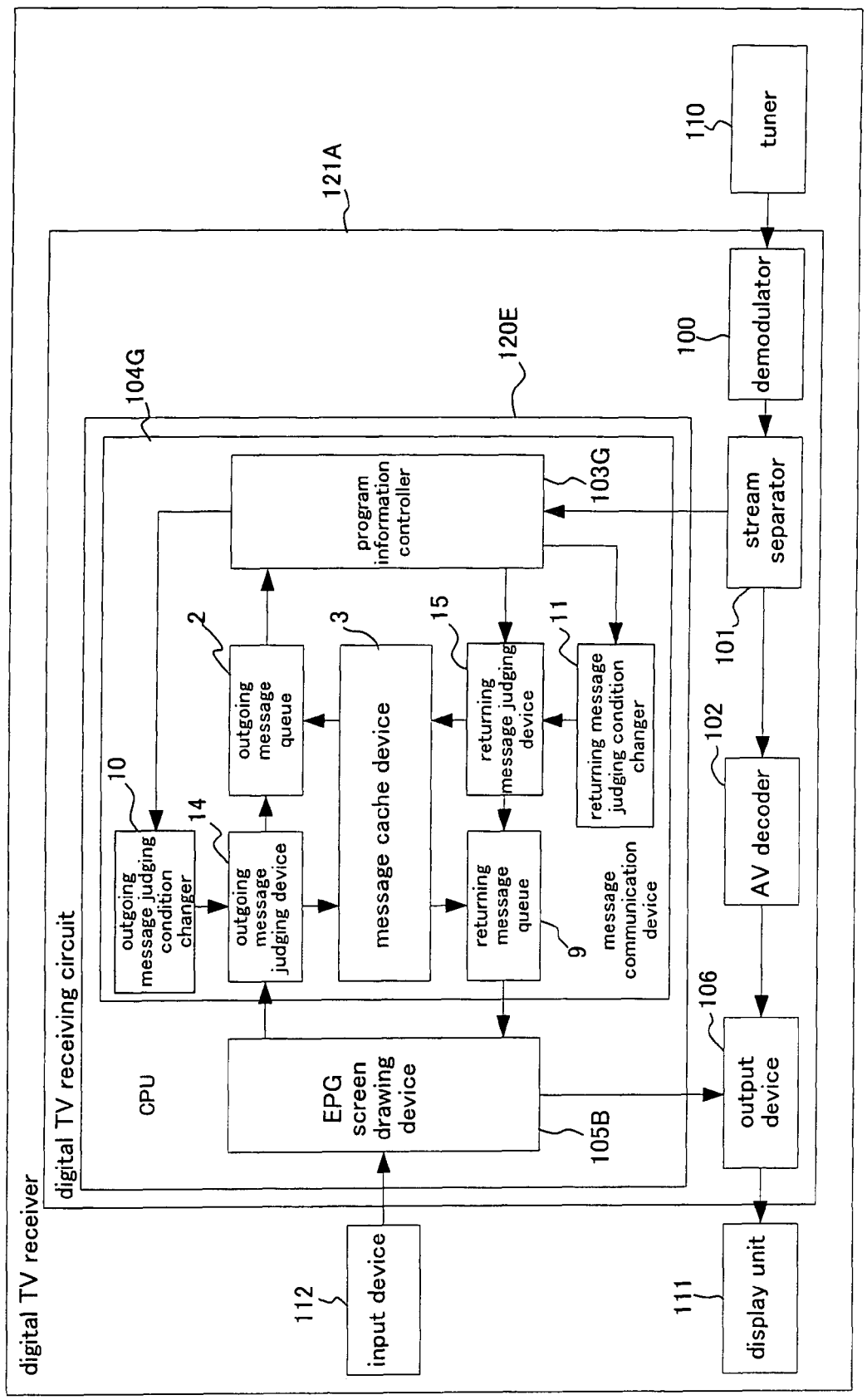
FIG. 10 is a block diagram showing the constitution of a digital TV receiving apparatus of a tenth embodiment of the present invention.

FIG. 10 is a block diagram showing the constitution of a digital TV receiving apparatus of a tenth embodiment of the present invention. The digital TV receiving apparatus comprises a tuner 110, digital TV receiving circuit 121A, display unit 11 and input device 112. The digital TV receiving circuit 121A comprises a demodulator 100, stream separator 101, AV decoder 102, CPU 120E and output device 106. The CPU 120E is constituted so that at least the message communication device 104D and EPG screen drawing device 105B are operated. Besides, the digital TV receiving circuit 121E may have a same constitution as the one described in at least one of the forth, fifth, seventh and eighth embodiments. The operation of the digital TV receiving circuit 121A is the same as that in the forth, fifth, seventh and eighth embodiments, and the explanation is abbreviated.

According to the embodiments, the amount of signal processing for the inquiry of program information, that is indispensable in the display of the EPG screen, is reduced substantially by the caching function of the message communication device 104G, which improves the display speed of the EPG screen of the digital TV receiving apparatus.

Eleventh Embodiments

Figure 11:
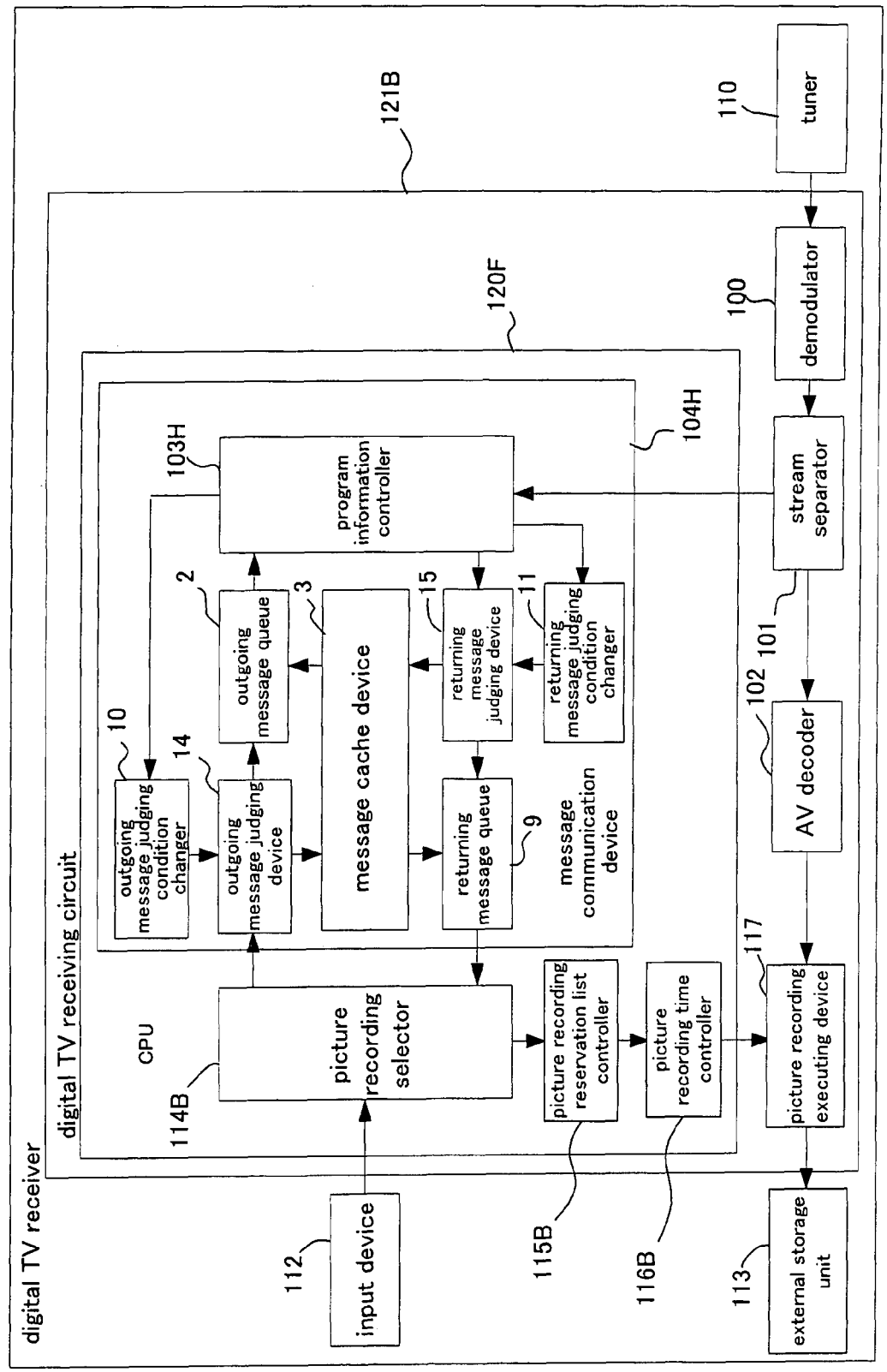
FIG. 11 is a block diagram showing the constitution of a digital TV receiving apparatus of an eleventh embodiment of the present invention.

FIG. 11 is a block diagram showing the constitution of a digital TV receiving apparatus of a eleventh embodiment of the present invention. The digital TV receiving apparatus comprises a tuner 110, digital TV receiving circuit 121B, external memory device 113 and input device 112. The digital TV receiving circuit 121B comprises a demodulator 100, stream separator 101, AV decoder 102, CPU 120F and picture recording executing device 117. The CPU 120F is constituted so that at least the message communication device 104H, picture recording program selector 114B, picture recording reservation list controller 115B and picture recording time controller 116B are operated.

Besides, the digital TV receiving circuit 121B may have a same constitution as the one described in one of the sixth and ninth embodiments. Since the operation of the digital TV receiving circuit 121B is same as that in one of the seventh and ninth embodiments, and the explanation is abbreviated.

According to the embodiments, the amount of signal processing for the inquiry of program information, that is indispensable at the time of the picture recording program selection and starting of picture recording of the program, is reduced substantially by the caching function of the message communication device 104H. Herewith, the circuit drive time at the time of the picture recording program selection and starting of picture recording is reduced, which is effective in reducing the power consumption of the digital TV receiving apparatus.

While preferred embodiments of the present invention have been described in detail, it should be apparent that various modifications and variations thereto are possible, all of which fall within the true spirit of the invention and the scope of the following claims.

What is claimed is:

1. A message communication device executing message communications between plural processes, comprising:
an outgoing message judging device for judging if an outgoing message sent from a sending process is cacheable or not, based on outgoing message judging conditions;
an outgoing message queue for queuing the outgoing message and sending out the queued message sequentially to a receiving process when the outgoing message judging device judges the outgoing message to be noncacheable;
a returning message judging device for judging if a returning message sent from the receiving process is cacheable or not, based on returning message judging conditions;
a returning message queue for queuing the returning message and sending out the queued message sequentially to the sending process when the returning message judging device judges the returning message to be noncacheable;
a message cache device for storing the returning message by associating the returning message to the corresponding outgoing message, when the returning message judging device judges the returning message to be cacheable, and sending out the returning message to the returning message queue, when the returning message judging device judges the returning message to be cacheable;
an outgoing message judging condition changer for dynamically changing the outgoing message judging conditions through a third process; and
a returning message judging condition changer for dynamically changing the returning message judging conditions through the third process, wherein
the outgoing message judging device changes the message judging conditions based on notifications from the outgoing message judging condition changer,
the returning message judging device changes the returning message judging conditions based on notifications from the returning message judging condition changer,
the outgoing message judging device judges the outgoing massage is cacheable when the outgoing message is not necessary to be transmitted from the sending process to the receiving process and judges the outgoing massage is noncacheable when the outgoing message is necessary to be transmitted from the sending process to the receiving process, and
the returning message judging device judges the returning message is cacheable when the returning message is not necessary to be transmitted from the receiving process to the sending process and judges the returning massage is noncacheable when the returning message is necessary to be transmitted from the receiving process to the sending process.

2. The message communication device of claim 1, wherein the message cache device comprises:
a message cache memory for memorizing cashed messages,
a cache searching device for searching through messages cached in the message cache memory,
an outgoing message updating device for updating the cache content of the message cache memory according to the content of the outgoing message, and
a returning message updating device for updating the cache content of the message cache memory according to the content of the returning message.

3. The message communication device of claim 2, further comprising:
an outgoing message judging condition list containing a set of the outgoing message judging conditions selected based on arbitrary basis;
a returning message judging condition list containing a set of the returning message judging conditions having the same content as the outgoing message judging condition list; and
a message judging condition changer for changing the outgoing message judging condition list and the returning message judging condition list, wherein
the outgoing message judging device judges outgoing messages, transmitted from the sending process, according to the outgoing message judging condition list, and
the returning message judges returning messages, transmitted from the receiving process, according to the returning message judging condition list.

4. A digital TV receiving circuit, comprising:
a demodulator for demodulating digital TV broadcast wave to convert it into transport stream;
a transport stream separator for decoding the transport stream demodulated by the demodulator to separate the decoded transport stream into AV stream and program information;
an AV decoder for decoding the AV stream to form audio signal and picture signal;
a program information controller for storing the program information;
the message communication device of claim 1;
an EPG screen drawing device for preparing electronic program guide screen image based on the results of inquiry after inquiring the program information controlled by the controller to the program information controller; and
an output device for superimposing the electronic program guide screen image on the picture signal and audio signal.

5. The digital TV receiving circuit of claim 4, further comprising;
a cache discarding device for discarding the cache information cached by the message communication device when the received program information contains an emergency alert broadcasting identifier.

6. A digital TV receiving circuit, comprising;
a demodulator for demodulating digital TV broadcasting wave to convert it into transport stream;
a transport stream separator for decoding the transport stream to separate the decoded transport stream into AV stream and program information;
an AV decoder for decoding the AV stream to form audio signal and video signal;
a program information controller for storing the program information;
the message communication device of claim 1;
a picture recording program selector for selecting programs to be recorded based on the result of inquiry after inquiring the program information controlled by the program information controller using the message communication device;
a picture recording reservation list controller for storing picture recording reservation information of the programs selected by the picture recording program selector;
a picture recording executing device for recording the video signal and audio signal; and
a picture recording time controller for starting the recording through operating the picture recording executing device when it is confirmed that a picture recording time set in the picture recording reservation list controller is arrived in view of the current time.

7. A digital TV receiving circuit, comprising:
a CPU;
a demodulator connected to the CPU for demodulating digital TV broadcast wave to convert it into transport stream;
a transport stream separator for decoding the transport stream to separate the decoded transport stream into AV stream and program information;
an AV decoder for decoding the AV stream to form audio signal and video signal;
an output device for superimposing screen image to the audio signal and video signal to output an obtained signal;
a program information controller for storing the program information;
the message communication device of claim 1; and
an EPG screen drawing device for preparing electronic program guide image based on the results of inquiry after inquiring the program information controlled by the program information controller using the message communication device.

8. A digital TV receiving circuit comprising;
a first CPU having a constitution where a program information controller for receiving and saving program information is operated;
a second CPU connected to the first CPU;
a demodulator connected to the first and second CPUs for demodulating digital TV broadcast wave to convert it into transport stream;
a transport stream separator for decoding the transport stream to separate the decoded transport stream into AV stream and program information;
an AV decoder for decoding the AV stream to form audio signal and video signal;
an output device for superimposing screen image to the audio signal and video signal;
the message communication device of claim 1; and
an EPG screen drawing device for preparing electronic program guide image based on the result of inquiry after inquiring the program information controlled by the program information controller using the message communication device, wherein
the second CPU has a constitution where the EPG screen drawing device is operated.

9. A digital TV receiving circuit, comprising;
a CPU;
a demodulator connected to the CPU for modulating digital TV broadcast wave to convert it into transport stream;
a transport stream separator for decoding the transport stream demodulated by the demodulator to separate the decoded transport stream into AV stream and program information;
an AV decoder for decoding the AV stream to form audio signal and video signal; and
a picture recording executing device for generating AV stream from the video signal and audio signal output from the AV decoder during the period from a reception of a picture recording start signal up to the reception of a picture recording finish signal; wherein
the CPU has a constitution where at least a picture recording program selector, a picture recording reservation list controller and a picture recording time controller are operated,
the picture recording program selector comprises a program information controller receiving and saving program information and the message communication device of claim 1, and selects a program to be recorded based on an inquiry result after inquiring the program information controlled by the program information controller using the message communication device,
the picture recording reservation list controller saves picture recording reservation information of programs selected by the picture recording program selector, and
the picture recording time controller transmits a picture recording start signal through detecting the arrival of a picture recording reservation time in the picture recording reservation information set in the picture recording reservation list controller and transmits a picture recording finish signal through detecting the end of the picture recording reservation time, in view of the current time.

10. A digital TV receiving circuit, comprising;
a first CPU having a constitution where a program information controller for receiving and saving program information is operated;
a picture recording program selector connected to the first CPU;
a picture recording reservation list controller for saving picture recording reservation information of programs selected by the picture recording program selector;
a second CPU having a constitution where a picture recording time controller transmits a picture recording start signal through detecting the arrival of a picture recording reservation time set in the picture recording reservation list controller and transmits a picture recording finish signal through detecting the end of the picture recording reservation time, in view of the current time;
a demodulator connected to the second CPU for demodulating digital TV broadcast wave to convert it into transport stream;
a transport stream separator for decoding the transport stream to separate the decoded transport stream into AV stream and program information;
an AV decoder for decoding the AV stream to form audio signal and video signal; and
a picture recording executing device for generating AV stream from the video signal and audio signal output from the AV decoder during the period from a reception of the picture recording start signal up to the reception of the picture recording finish signal, wherein
the picture recording program selector comprises the message communication device of claim 1, and selects a program to be recorded based on an inquiry result after inquiring the program information controlled by the program information controller using the message communication device.

11. A digital TV receiving apparatus, comprising;
a tuner for receiving digital TV broadcasting waves; and
the digital TV receiving circuit of claim 4 for generating video signal and audio signal from the digital TV broadcasting wave received by the tuner to output the signal to a display device.

12. A digital TV receiving apparatus, comprising;
a tuner for receiving digital TV broadcasting wave; and
the digital TV receiving circuit of claim 6 for generating AV stream from the digital TV broadcasting wave received by the tuner to output the signal to an external storage device.

* * * * *